United States Patent [19]

Ishikawa et al.

[11] 4,169,512
[45] Oct. 2, 1979

[54] POWER UNIT SWINGING TYPE MOTOR CYCLES

[75] Inventors: Masaru Ishikawa, Higashi-Murayama; Nagatoshi Katagiri, Asaka; Shigenaga Enoki, Wako; Kozo Ohta, Sayama, all of Japan

[73] Assignee: Honda Giken Kogyo Kabushiki Kaisha, Tokyo, Japan

[21] Appl. No.: 800,172

[22] Filed: May 25, 1977

[30] Foreign Application Priority Data

| Jun. 1, 1976 | [JP] | Japan | 51-70430[U] |
| Jun. 1, 1976 | [JP] | Japan | 51-70432[U] |
| Jun. 1, 1976 | [JP] | Japan | 51-70433[U] |
| Jun. 2, 1976 | [JP] | Japan | 51-71031[U] |
| Jun. 2, 1976 | [JP] | Japan | 51-71032[U] |

[51] Int. Cl.² ............................................. B62K 25/10
[52] U.S. Cl. ................................ 180/205; 55/385 B; 55/DIG. 28; 123/179 SE; 123/198 E; 180/227; 180/228; 280/284; 280/288
[58] Field of Search ................ 180/33 R, 33 A, 33 B, 180/33 C, 35, 30, 32; 280/288, 284; 55/385 B, DIG. 28; 123/179 SE, 198 E

[56] References Cited

U.S. PATENT DOCUMENTS

| 2,329,248 | 9/1943 | Carlson | 180/35 |
| 2,490,245 | 12/1949 | Woolsey | 180/33 R |
| 3,915,249 | 10/1975 | Garside | 180/33 R |
| 4,019,594 | 4/1977 | Koyama | 180/33 |

FOREIGN PATENT DOCUMENTS

| 891055 | 8/1953 | Fed. Rep. of Germany | 180/32 |
| 1321433 | 2/1963 | France | 180/33 C |
| 89633 | 12/1958 | Netherlands | 180/33 A |
| 631946 | 11/1949 | United Kingdom | 180/35 |
| 694493 | 7/1953 | United Kingdom | 180/33B |

*Primary Examiner*—John P. Silverstrim
*Attorney, Agent, or Firm*—Irving M. Weiner; Pamela S. Burt; Melvin Yedlin

[57] ABSTRACT

A swinging power unit type motorcycle having an engine swingably hung and pivoted on a body frame, and a pair of plates forming a rear fork connected to the engine. A chain drive transmits power from the engine to a reduction gearbox which incorporates the rear wheel axle and is supported between the rear fork. Shock absorbers are connected between the body frame and the rear fork. The engine, rear fork, rear wheel axle, chain drive, and reduction gearbox are interconnected to swing as a unit relative to the body frame.

17 Claims, 10 Drawing Figures

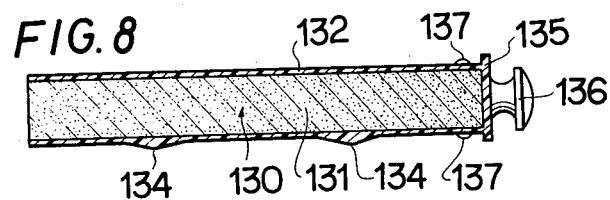
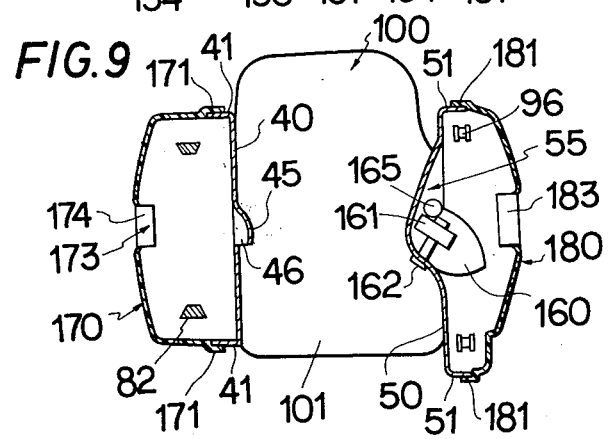
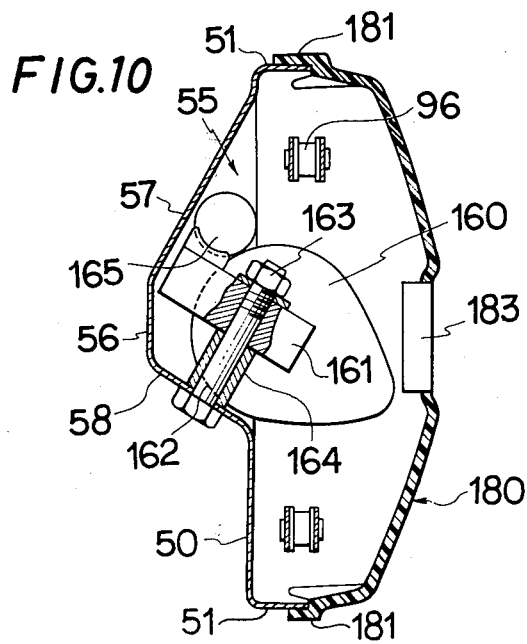

POWER UNIT SWINGING TYPE MOTOR CYCLES

The invention relates to a swinging power unit type motorcycle wherein a power unit, formed by integrally connecting an engine, rear fork, rear wheel, and power transmitting member, is made swingable with respect to a frame.

Particularly, the invention relates to a motorcycle wherein a rear fork forming member is formed of a pair of right and left plates and is integrally connected in its front part with an engine hung and pivoted on a frame, and in its rear part to the right and left on the rear wheel side. A power transmitting member is arranged between the front and rear of the sides of the rear fork plates. A box-shaped air cleaner case is combined between the right and left rear fork plates, and an air cleaner is reasonably arranged while the rear fork plates are reinforced with the above-mentioned respective parts and the cleaner case. An ignition coil is arranged on the side of the rear fork plate covered on the side, and is housed and protected while the space is effectively utilized. Cuts are made in the cover so that a power transmitting system having little noise may be obtained.

BACKGROUND OF THE INVENTION

In the power system of a motorcycle, generally an engine is mounted on a body. A rear fork formed of pipe members is pivoted at one end to the intermediate rear part of the body. A rear wheel is borne at the other end, and is connected at said other end with the body side through cushion units to be swingable including the rear wheel. The rear wheel and engine are connected with each other through a chain or the like.

In the above power system, because the engine and the rear fork supporting the rear wheel are separated from each other, and the rear wheel including the rear fork swings, a chain tensioner for the chain (or a belt tensioner in case a belt is used) will be required and the mechanism including its supporting means will be complicated. Therefore, such system is adopted in a somewhat large motorcycle. In case a small light motorcycle is to be simplified, a simplified system in which the power system moves integrally is desirable.

Where the power system moves integrally, the unsprung weight for the cushion necessarily becomes so large that the life and durability of the shock absorbers, the function, and the riding comfort are reduced.

Therefore it is necessary to lighten and simplify the power system including the rear wheel suspending supporting means, and a sufficient strength must be retained while attaining the above.

In case such system mentioned above is adopted, as the engine moves, it will be very difficult to arrange a suction system in a proper position. Particularly, it is not desirable to provide an air cleaner and suction pipe on the body side because the entire power unit swings, but it is desirable to provide them within this unit to swing integrally with the engine.

In case the above system is adopted, the position of housing and mounting an ignition coil will be a problem. Generally, the ignition coil is housed below a seat or a tank. In such case, the high tension cord will be so long as to be undesirable for wiring and appearance. However, in case the problem of heat is considered, it will not be desirable to place the coil near the engine.

In case the above system is adopted, a chain or belt which is a power transmitting member will be arranged on the side of the unit. However, when it is exposed, noise will be produced when driving and rainwater or muddy water will be applied to it. containing the chain or belt in a semi-sealed box-shaped body can effectively protect the chain from rainwater or muddy water, but is a poor countermeasure for preventing noises. Vibrations of the drive of the chain or belt will resonate with the sealed box-shaped body to cause such closed sounds as growls, and the closed sounds will emanate out through the clearances of the box-shaped body to generate noises.

SUMMARY OF THE INVENTION

The present invention provides a swinging power unit type motorcycle, including a body frame, an engine swingably hung and pivoted on the body frame. A pair of right and left plates forming a rear fork are connected in their front end portions to the engine. Power transmitting means transmits power from the engine to the rear wheel axle. The rear wheel axle is supported between the rear end portions of the pair of right and left plates. The shock absorbers are connected between the body frame and the pair of right and left plates. The engine, the rear fork, the rear wheel axle, and the power transmitting means are arranged and interconnected to swing integrally as a unit relative to the body frame of the motorcycle.

An object of the invention is to provide a motorcycle wherein a rear fork forming member is formed of a pair of right and left plates. The respective fork plates are connected in the front parts to an engine pivoted swingably to a body frame. The plates are supported in their rear parts to hold a rear wheel between them, and are connected in their rear parts to the body side through shock absorbers. The engine is used as a strengthening member for a part of the rear fork so that a unit consisting of the engine, rear fork, rear wheel and power transmitting member may swing integrally.

An object of the invention is to provide a motorcycle wherein the swinging unit is lightened and simplified while maintaining sufficient strength. The body system is made lighter and simpler, and the cost is greatly reduced.

Another object is to provide a motorcycle which can be driven by either engine power or an artificial operation, and wherein a pedal shaft supporting part is used as a strength member for the rear fork plates.

A main object is to provide a motorcycle wherein a hollow box body is arranged as an air cleaner case between the rear fork plates forming the above-mentioned unit, and a suction means is formed by using this box body as a strengthening member for the rear fork plates.

An object is to provide a motorcycle wherein a practical and sufficient strength can be obtained while making the abovementioned unit light and simple, and wherein suction means is provided by utilizing the dead space between the rear fork plates.

Another object is to provide a motorcycle wherein an air cleaner case is provided as a strengthening member to form a part of the above-mentioned unit, and suction means swings integrally with the unit.

A further object is to provide a motorcycle wherein the box body forming the air cleaner case and arranged between the rear fork plates is formed to be longitudinally long and is sectioned with an air cleaner element in its intermediate portion in the vertical direction. One of the sectioned chambers is connected to the outside atmosphere, and the other chamber is connected to a carburetor suction port.

A further object is to provide a motorcycle wherein the upper chamber sectioned with the air cleaner element is connected to a carburetor suction port, an expansion chamber is formed in the lower chamber and is connected to the lower part of a suction tube provided vertically adjacently to the cleaner case. A suction passage is long enough to attain a necessary capacity, and the suction tube is provided vertically. The suction port is directed upwardly and the suction means also has a dust entry preventing feature.

An object is to provide a motorcycle wherein, as the air cleaner case is supported on its sides by the rear fork plates, the cleaner element fitted within the case is made removable through the side to be able to be replaced by being pulled out through the side without disassembling the case. The element fitting and replacing operations are simple and easy.

A further object is to provide an air cleaner element of a type to be used in the above-mentioned air cleaner so as to be inserted and pulled out through the side.

Another object is to provide a motorcycle of the abovementioned unit swinging type wherein a concavity for containing an ignition coil is formed on the side surface of one of the rear fork plates. The ignition coil is mounted in this concavity and is covered with a cover which also covers a power transmitting member, such as a chain or belt.

Another object is to provide a motorcycle wherein the abovementioned power unit swinging type rear fork is provided, the ignition coil and high tension cord are also integrally swung, the cord is not bent and is advantageously protected. The ignition coil can be easily replaced by merely removing the cover.

A further object is to provide a motorcycle of a power unit swinging type wherein the rear fork plates are covered on their sides with covers. Cut parts making the inside and outside of the cover communicate with each other are made on each cover to reduce noises generated by the power transmitting means. The power transmitting means is effectively protected from rainwater and muddy water, while preventing noises.

BRIEF DESCRIPTION OF THE DRAWINGS

FIG. 8 is a sectioned view on line 8—8 in FIG. 7.

FIG. 9 is a sectioned view on line 9—9 in FIG. 2.

FIG. 10 is a sectioned view of a part for containing an ignition coil.

DETAILED DESCRIPTION

Figure 1:
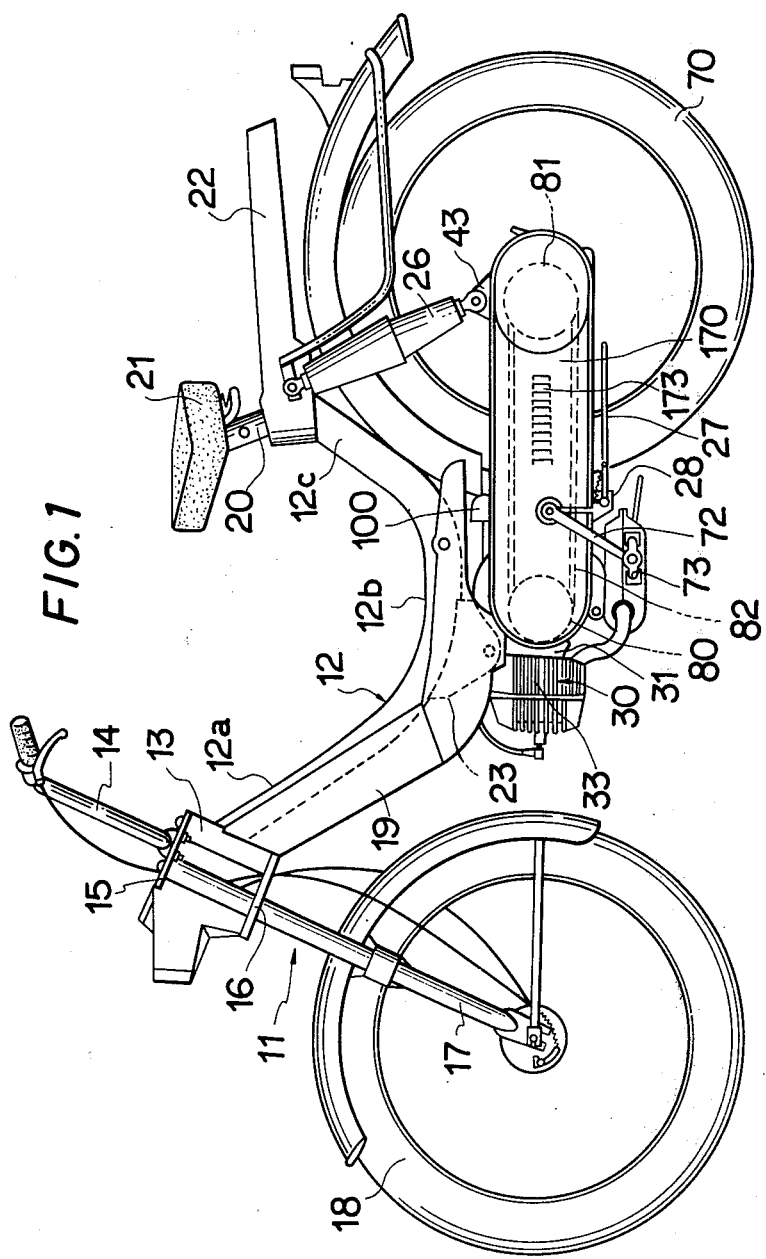
FIG. 1 is a side view of a swinging power unit type motorcycle according to the invention.

FIG. 1 is a side view of a motorcycle according to the invention. The illustrated embodiment shows the driving systems, viz., a driving system by engine power, and an artificial driving system by pedal operation. The invention can be applied with only a driving system by engine power.

A body frame 12 of a motorcycle 11 is formed by bending pipe material to a predetermined contour. Frame 12 is curved substantially in the form of a "U" between a front portion 12a and a curved intermediate portion 12b to be easy to stride. Portion 12a is connected with a front fork 17 through a head tube 13. Top and bottom bridge members 15 and 16 fitted with a steering handle 14, and a front wheel 18 are supported by fork 17. A fuel tank 19 is provided in the front part of portion 12a. A seat post 20 projects from the top of a rear frame portion 12c rising rearwardly from portion 12b to provide a riding seat 21 for the rider. A carrier 22 is provided in a rearwardly extended part (not shown) of portion 12c.

As shown in FIGS. 1 to 4, a supporting bracket 23 is suspended to project below portion 12b. Fitting arms 32 extended to it from the right and left of a crankcase 31 of an engine 30 are borne with a supporting shaft 24 provided to cross the bracket 23. Arms 32 are fitted to shaft 24 through mounting rubbers 25 so that the entire engine 30 may be swingable with shaft 24 as a fulcrum. Engine 30 is hung and supported on portion 12b through shaft 24. A cylinder 33 is made horizontal to that the cylinder head may be directed forwardly. A piston and crankshaft fitted in the cylinder are arranged as directed horizontally.

Fitting parts 34 are integrally provided to project above and below on the right and left of crankcase 31. Right and left connecting plates 35 which are C-shaped in their side surfaces are connected in their upper and lower end parts to parts 34 by screws 36 or the like, and are integrally connected by welding or the like in their intermediate portions to the front end parts of right and left rear fork plates 50 and 40.

Figure 6:
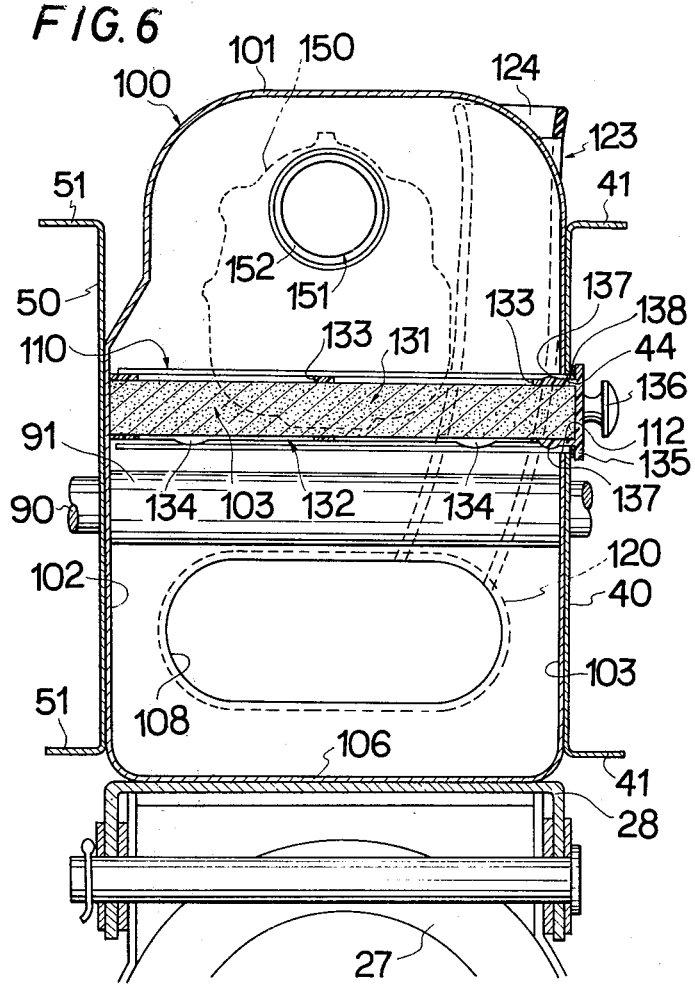
FIG. 6 is a sectioned view on line 6—6 in FIG. 5.

As shown in FIGS. 6 and 9, the rear fork plates 50 and 40 are bent outwardly in the upper and lower end edges to keep and improve the strength with upper and lower bent projecting pieces 51 and 41. Plates 50 and 40 are formed by pressing and shaping steel plate materials, and are provided symmetrically with each other on the right and left.

A reduction case 73 and rear axle 72 are supported between the rear end parts of plates 50 and 40. Case 73 is screwed and connected by bolts 75 on one side to the rear end part of one rear fork plate cut to be V-shaped at its rear end. A rear brake panel case 74 provided on the other side of case 73 is screwed and connected by bolts 76 to the corresponding part of the other rear fork plate 50. Axle 72 is supported between the rear end parts of plates 40 and 50. A rear wheel 70 is fitted through a hub 71 to the periphery of axle 72 to be held in the front half part between plates 40 and 50 and to be located in the space between them.

A pulley 80 is connected to an output shaft 37 projected on the side surface on the side of plate 40 of crankcase 31. A pulley 81 is connected to an input shaft 77 of case 73 projected on the side surface of plate 40. A belt 82 is hung and stretched between pulleys 80 and 81, and is arranged by keeping a clearance outside plate 40 to drive the wheel 70 with an input through the shaft 77 by the drive of the engine.

The driving system by the artificial operation in provided outside the other plate 50. A pedal operating shaft 90 is mounted crosswise in the front parts near crankcase 31, and is supporting pipe 91 mounted crosswise between plates 40 and 50. Pipe 91 is fitted in through holes 42 and 52 made respectively in plates 40 and 50, and is welded to the peripheries of holes 42 and 52 to increase the strength of plates 40 and 50.

Shaft 90 is extended by proper lengths in both right and left end parts outside plates 50 and 40, and pedal arms 92 and pedals 93 are connected to the extended ends. A driving sprocket 94 is fixed, separated from the outside surface of plate 50, to the part of shaft 90 projected on the outside surface of plate 50. A driven sprocket 95 is fitted through a one-way clutch to the extended part of axle 72 outside plate 50. A chain 92 is hung and fitted between sprockets 94 and 95. A chain tensioner 97 (FIG. 4) is provided in a part and is adjustably set on the side surface of plate 50. When engine 30 is not running, the pedals 93 are trodden to drive the shaft 90, and wheel 70 is driven by an artificial operation through sprockets 94 and 97 and chain 96.

Fitting parts 43 and 53 for fitting the lower ends of shock absorbers 26 are provided in the upper parts of the rear ends of plates 40 and 50. Shock absorbers 26 are connected at their upper ends to the rear portion of frame 12 to form a power unit type rear fork.

The rear fork connects engine 30 and axle 72 with each other through the right and left plates 50 and 40 so that the shocks of wheel 70 from the road surface may be transmitted to the rear frame, the entire rear frame may swing pivoting the engine 30 with the fulcrum 24 as a center, and the shocks may be cushioned by absorbers 26. Engine 30, plates 40 and 50, rear wheel 70, the power transmitting means or system, artificial driving system and its power transmitting system swing integrally as a unit.

The rear fork is formed by plates 50 and 40, and is connected in the front part to engine 30, and thus engine 30 functions as a strength member. Because plates 40 and 50 are channel-shaped in cross-section (FIG. 6), their strength is increased. Pipe 91 is mounted between plates 40 and 50 so that the strength is further improved. Plates 40 and 50 are connected in their rear parts to case 73 and brake panel case 74 to form parts of strength members.

The rear fork unit is made as simple as possible in structure. By using plates, the unit can be made light while maintaining a practical sufficient strength.

The rigidity and strength and promoted by providing an air cleaner case of a suction means between plates 40 and 50 to effectively function as a strength member for plates 40 and 50.

Figure 5:
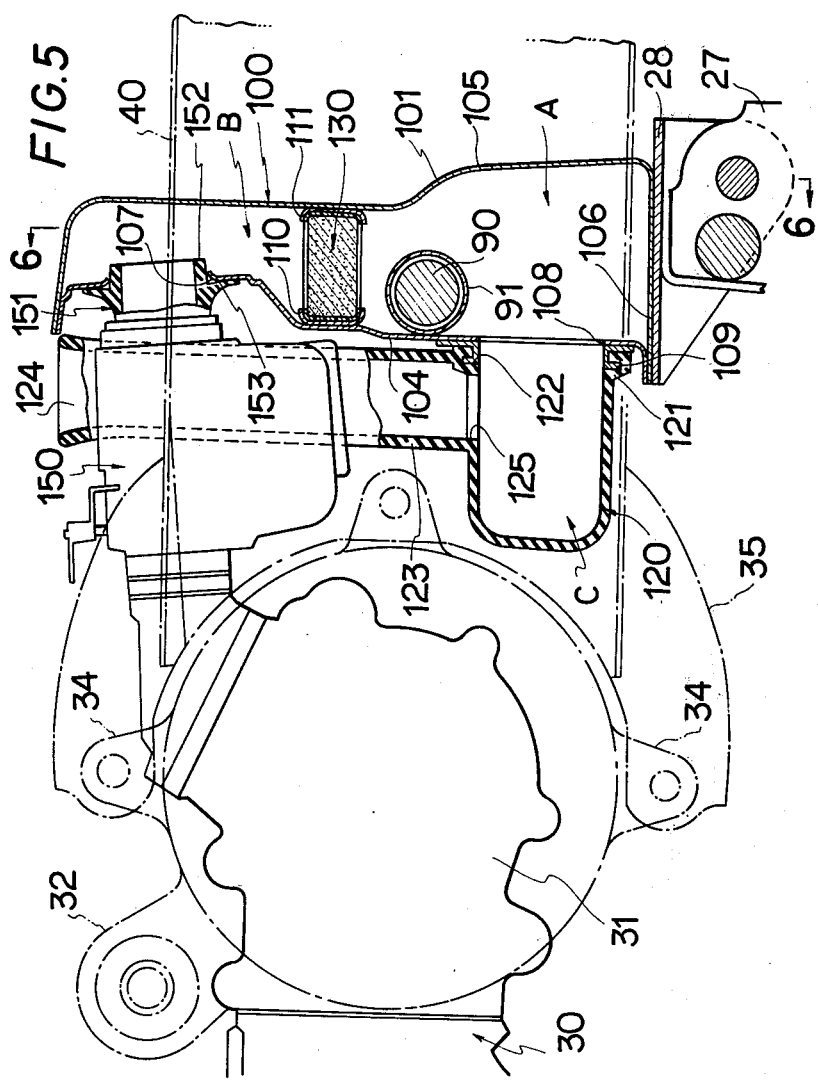
FIG. 5 is a sectioned side view showing suction means including an air cleaner provided between rear fork plates.

A body 101 (FIG. 5) of an air cleaner case 100 is longitudinally long hollow box-shaped, and is formed of a steel plate material. Right and left side plates 103 and 102 of body 101 are connected by welding or the like on the outside surfaces respectively to the inside surfaces of plates 50 and 40. Alternatively, plates 50 and 40 may function as the side plates 103 and 102. Body 101 is provided near the engine near the front parts of plates 40 and 50. In the illustrated embodiment, pipe 91 is provided crosswise through body 101.

The distance between front and rear plates 104 and 105 of body 101 is set to be large in the lower part, and small in the upper part. In the intermediate part between the upper and lower parts, an air cleaner element 130 or filter is arranged crosswise in the width direction to section the space in body 101 into chamber A and B. The volume of lower chamber A is set to be large, but that of upper chamber B is set to be small. A bracket 28 is suspended to project on the lower surface of bottom plate 106 of body 101. A stand 27 is pivoted to bracket 28 to be free to rise and fall.

A hole 107 opening in chamber B and throttled and somewhat projected inwardly is provided in the upper part of plate 104. A connecting tube 151, connected at one end with a suction port of a carburetor 150, is fitted in hole 107 so that carburetor 150 and chamber B are connected to communicate with each other. Tube 151 is formed of rubber, and is connected by fastening or the like at its base end to the suction port of carburetor 150. Tube 151 is provided on the outer periphery of the intermediate portion with a lip 152 tapered in the side cross-section and projecting forwardly and is fitted at its tip 152 in hole 107 so that lip 153 may resiliently contact the outside surface of the periphery of hole 107 to seal the hole.

An opening 108 is formed in the lower part of plate 104, is made laterally long, and is set to be large in its opening area (FIG. 6). A connecting box body 120 formed of rubber is connected to the front surface of opening 108. A thick boss part 121 is provided in the front end part of the opening. A groove 122 is formed on the inner periphery of the boss part and is fitted and locked to a frame piece 109 provided to surround the front surface of opening 108 to fit body 120 to the front surface of the opening in the lower part of body 101. Chamber C in body 120 is set to be large, and is made to communicate with chamber A through opening 108.

A suction tube 123 is vertically provided upwardly on the side of body 120. Suction port 124 of tube 123 opens upwardly and is extended out to substantially the same height as the top of body 101. The intermediate portion of tube 123 is adjacent to the side of carburetor 150, and port 124 is arranged on the side thereof. Tube 123 communicates in its lower part with chamber C. The volume expands from this through hole 125 to form an expansion chamber of chambers C and B. Tube 123 is formed of rubber, and is formed integrally with body 120 in the illustration, but may be separately formed and then combined with body 120.

In providing the suction means, the body 101 is integrally arranged between plates 50 and 40 to function as a strength member for plates 40 and 50. Body 101 is provided by utilizing the dead space between plates 50 and 40, and is very advantageous in space utilization. Because body 101 swings integrally with the unit swinging motion of plates 40 and 50, the carburetor 150 and air cleaner can be simply connected with each other by a simple connecting means. It is not necessary to connect the carburetor and air cleaner with each other through a long tube.

Air is sucked in through port 124, passes through tube 123, is led into chamber C through the hole 125, is led into chamber A through the opening 108, is filtered by passing through element 130, and is led as clean air into chamber B. The clean air in chamber B is sucked into carburetor 150 through the connecting tube 151, and mixes with a fuel to feed a gasified fuel to engine 30.

Body 101 is vertically long, and tube 123 is vertically provided. Therefore, the suction passage can be set to be long enough and a favorable suction system high in efficiency can be obtained. The chambber A and the chamber C communicating with it are large enough in volume to act as expansion chambers to that the air sucked in through tube 123 may be fed into carburetor 150 at high efficiency, and the performance of the engine may be thereby improved.

Because tube 123 is vertically long and port 124 is directed upwardly, dusts can be prevented as much as possible from being sucked in. The air cleaner case is held between the rear fork plates, is not exposed, is very advantageous to space utilization, and has a favorable appearance and design. Since the air cleaner case is shielded on both sides by the rear fork plates, the suction sounds of the air cleaner are intercepted by plates 40 and 50 and prevented as much as possible from leaking out, and thus a quiet suction system is obtained.

The suction means is provided between plates 40 and 50.

Element 130 is set to be of a length crossing the width of body 101, and is formed to be wide rectangular in cross-section. Rail-shaped holding members 110, and 111, channel-shaped in cross-section, are fixed opposed to each other on the open sides to the inside surface of plate 104 and the inside surface of plate 105 facing it. Element 130 is engaged and fitted between members 110 and 111 by being slid from the side.

An inserting port 44 for inserting element 130 is formed on the corresponding side surface of plate 40. An inserting port 112 connected with port 44 is formed on the facing side plate 103 so that element 130 may be inserted and pulled out through these connected ports 44 and 112.

Figure 7:
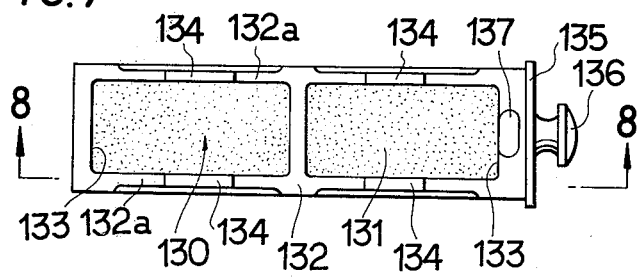
FIG. 7 is a bottom view of an air cleaner element.

As shown in FIGS. 7 and 8, the element 130 is formed of a filter, rectangular in cross-section, long in the lateral direction, and fitted in a cleaner case 132 long in the lateral direction. Two windows 133, each having sufficient size, are made in the lengthwise direction on each of the upper and lower parts of case 132 so that air may be filtered by passing through filter 131 from windows 133. Two projections 134 project downwardly in the form of ridges in the lengthwise direction on the right and left frames 132a below case 132. A lid plate 135, larger than port 44, is provided at one end of the case. A knob 136 projects on the end surface of lid plate 135. Locking projections 137 are provided in front of lid plate 135 above and below case 132. The respective parts of case 132 are integrally formed of plastic.

When element 130 is inserted into body 101 through ports 44 and 122, the case 132 slides as inserted on the right and left between holding members 110 and 111. Projections 132 slide as strongly fitted to holding members 110 and 111. Either of the opposed projected pieces 110a and 111a of members 110 and 111 flex or projections 134 deform so that the element may be forcibly pressed in. At the inserting limit, the projections 137 pass over ports 44 and 112, and function as stoppers. Projections 134 function as stoppers to hold element 130 as inserted. In the drawings 138 is a ring-shaped sealing member inserted between the back surface of lid plate 135 and the peripheral part of port 44.

Element 130 is held as fixed crosswise in body 101.

When element 130 is to be replaced, it is pulled out by knob 136, and a new element is inserted through ports 44 and 112. Thus, the element can be very easily replaced.

Knob 82 should be provided so as not to interfere with belt 82.

A housing concavity 55 (FIG. 2) concaved inwardly is provided between shaft 90 and rear wheel axle 72 in the intermediate portion in the lengthwise direction of plate 50 having a power transmitting member, such as chain 96, outside. As shown in FIG. 10, an upper wall 57 of housing concavity 55 is inclined at a small agle to an intermediate wall 56. A lower wall 58 is inclined at a large angle, and is made a base for fitting an ignition coil 160. Concavity 55 is provided in the intermediate part between the upper and lower portions of chain 96 in the height direction of plate 50 so that particularly the base 58 may be somewhat below the intermediate part between the upper and lower portions of chain 96. Base 58 is formed integrally at the time of pressing and shaping plate 50.

Coil 160 is secured by passing bolts 162 from the back side of base 58 through its base 161, screwing nuts 163 to the ends of bolts 162, and fastening base 161. A collar 164 is provided around bolt 162. A condenser 165 attached to coil 160 is integrally supported with base 161 so that the coil may be housed intermediately between the upper and lower portions of the chain 96 and not interfere with the chain.

A high tension cord 167 connected to coil 160 is led to the back side of plate 50 through a hole 59 formed on the side surface of concavity 55, and is connected at its tip with a plug projecting on the cylinder head of engine 30 by a plug cap 168.

Coil 160 is contained and held in concavity 55 provided on the side surface of plate 50. The concavity is provided on the outside surface of plate 50 to the advantage of utilizing the dead space of the rear fork. Coil 160 can be separated from engine 30 can be prevented from being influenced by the heat of the engine. Covers 180 and 170 are applied to plates 50 and 40 so that coil 160 is held sealed and protected from rainwater and muddy water. As the coil swings integrally with the power unit, the high tension cord will not be bent and will be protected. In replacing the coil, when the cover is removed, the coil will be exposed.

Covers 180 and 170 are provided to respectively cover the outside surfaces of plates 50 and 40, and are formed of plastic. Cover 170 covers pulley 80 on one side, and is longer forwardly than cover 180. Stepped locking parts 171 and 181 are provided above and below the covers, and are rigidly fitted and pressed onto the upper and lower pieces 41 and 51 of plates 40 and 50 to secure covers 170 and 180 to the plates. Sufficient spaces are formed between the back surfaces of covers 170 and 180 and the outside surfaces of plates 40 and 50.

Both extended ends of shaft 90 are fitted to the front parts of covers 170 and 180, and holes 172 and 182 for leading them out are provided.

Figure 2:
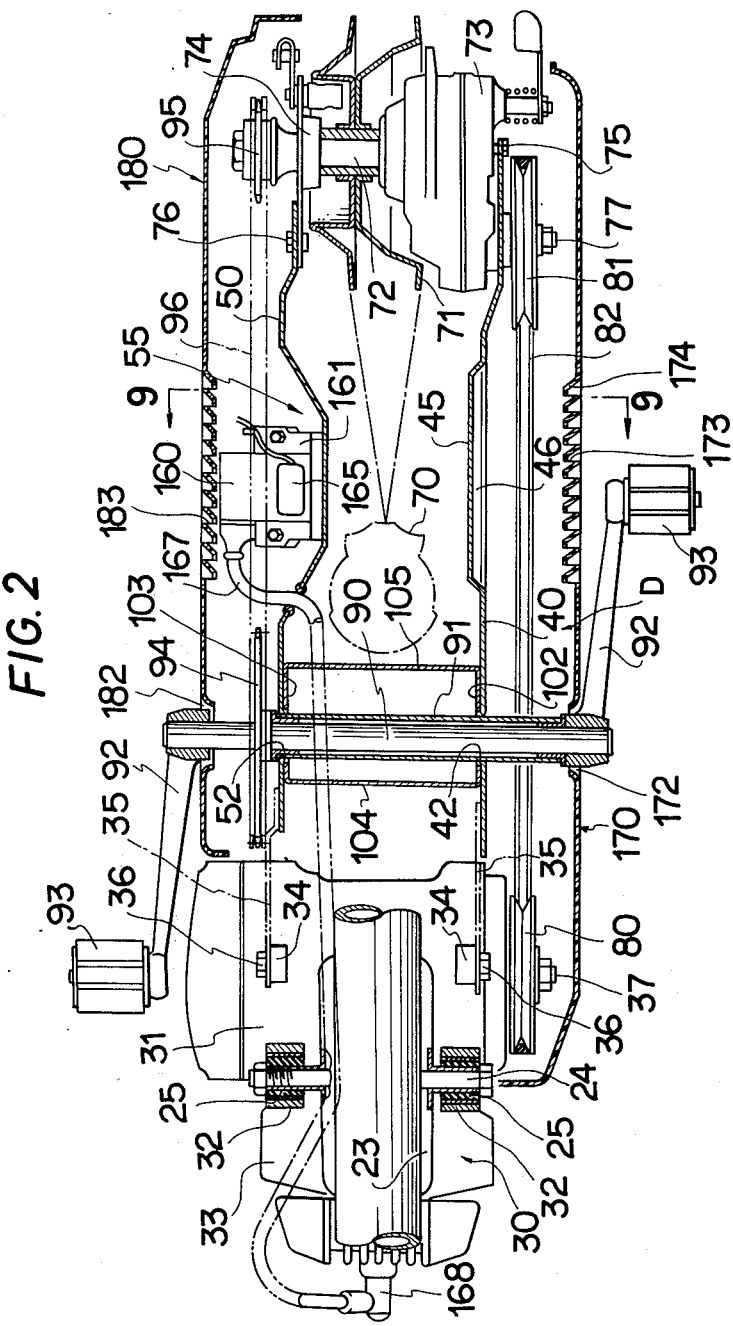
FIG. 2 is a plan view showing the structure of a swinging power unit part.
Figure 3:
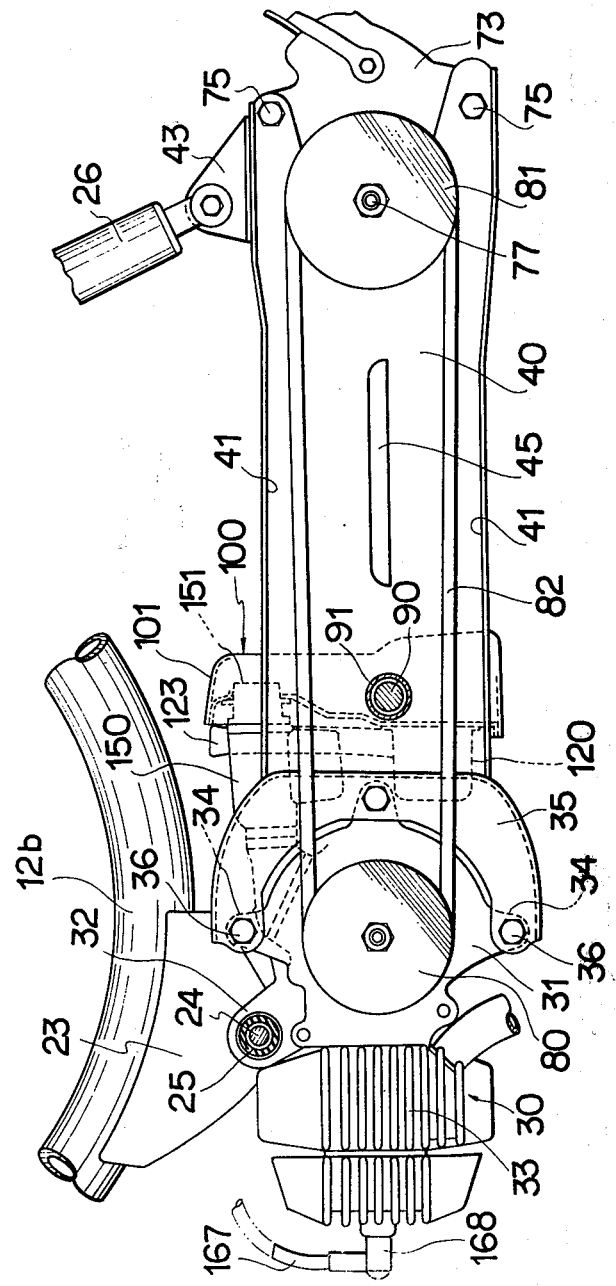
FIG. 3 is a side view of one side of said part with the cover removed.
Figure 4:
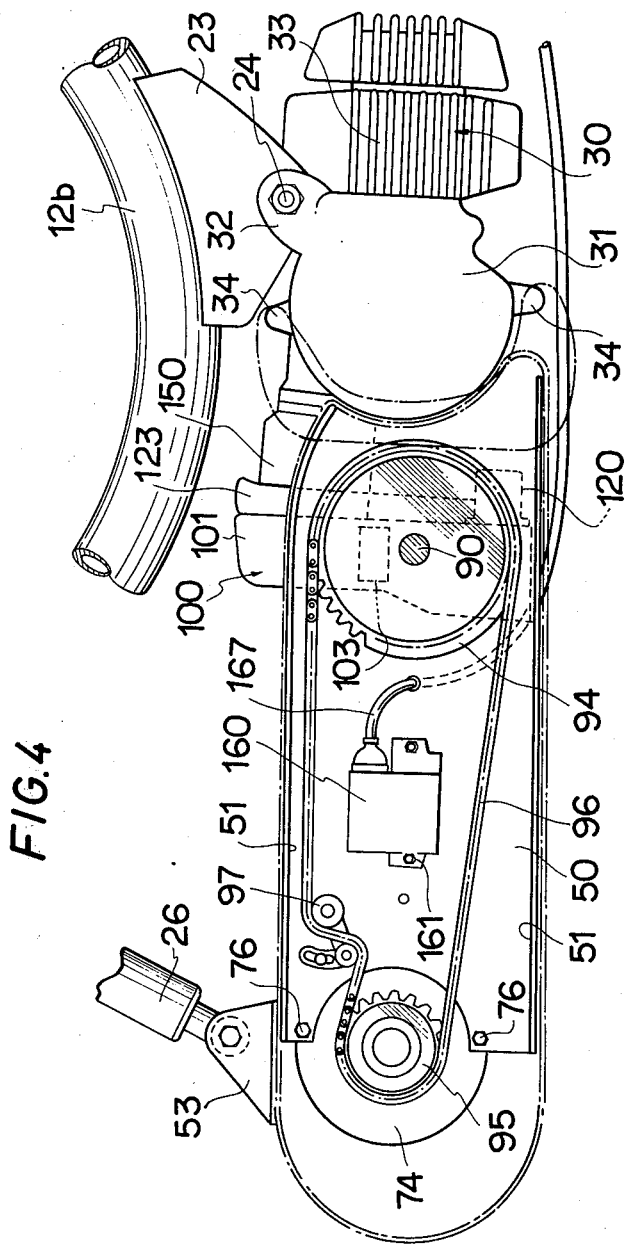
FIG. 4 is a side view of the other side of said part with the cover removed.

In the intermediate portion in the lengthwise direction of each cover or particularly of the cover 170 housing belt 82 to be driven by engine 30, cuts 173 making the space D between cover 170 and plate 40 and the outside communicate with each other are formed over a proper length. In FIGS. 2 and 9, cuts 173 are gallery-shaped and have slopes 174 closing the surface directed in the advancing direction of the motorcycle to prevent rainwater and muddy water from coming in. Cuts 173 are set in the intermediate portion of cover 170 where the vibration of belt 82 housed inside is the greatest. Similar gallery-shaped cuts 183 are also provided in the other cover 180.

In the facing position of plate 40 opposed to the inside surface of cover 170, a cut 46 is formed over the same range by expanding 45 the plate material inwardly and cutting off the lower end in the lengthwise direction.

In the intermediate portions in the lengthwise direction inside and outside space D, the cuts 46 and 173 making the interior of space D and the outside communicate with each other are formed over predetermined ranges.

Inside cut 46 is not made on plate 50, because the artificial chain drive by the pedal operation is made only when starting the engine. Optionally, it may also be made on plate 50. In such case, coil 160 fitting position may be considered.

When belt 82 is driven, it will vibrate greatly in the intermediate portion and will resonate with the box-shaped body formed by cover 170 and plate 40 to generate noises. This resonance by the vibration of belt 82 will escape to the air by the inside and outside cuts, and plate 40 and cover 170 will not resonate and vibrate, and only the belt will vibrate. The vibration is damped by the action of the cuts.

We claim:

1. A motorcycle, comprising:
a body frame;
an engine swingably hung on said body frame;
a pair of right and left plates forming a rear fork connected in the front end portions thereof to said engine;
a rear wheel axle supported between the rear end portions of said pair of right and left plates;
power transmitting means for transmitting power from said engine to said rear wheel axle;
shock absorbers connected between said body frame and said pair of right and left plates whereby said engine, said rear fork, said rear wheel axle, and said power transmitting means swing as a unit relative to said body frame of said motorcycle;
a concavity made in their intermediate portion of one of said rear fork plates; and
an ignition coil housed and secured in said concavity.

2. A motorcycle according to claim 1, including:
a high tension cord extending through said one of said plates for connecting said ignition coil to said engine.

3. A motorcycle comprising:
a body frame;
an engine swingably hung on said body frame;
a pair of right and left plates forming a rear fork connected in the front end portions thereof to said engine;
a rear wheel axle supported between the rear end portions of said pair of right and left plates;
power transmitting means for transmitting power from said engine to said rear wheel axle;
shock absorbers connected between said body frame and said pair of right and left plates whereby said engine, said rear fork, and said power transmitting means swing as a unit relative to said body frame of said motorcycle; and
an air cleaner, said air cleaner including a hollow vertically elongated, box-shaped body mounted between said plates, an air cleaner element mounted within said body, said element sectioning said body into a first, upper chamber communicating with a suction port of a carburetor of said motorcycle, and a second, lower chamber communicating with outside atmosphere, said second chamber being larger than said first chamber.

4. A swinging power unit type motorcycle, comprising:
a body frame;
an engine swingably hung on said body frame;
a pair of right and left plates forming a rear fork connected in the front end portions thereof to said engine;
a rear wheel axle supported between the rear end portions of said pair of right and left plates;
power transmitting means for transmitting power from said engine to said rear wheel axle;
a hollow box-shaped air cleaner case mounted between said plates;
said air cleaner case being formed by a vertically extending elongated body and being sectioned intermediately by an air cleaner element;
a first chamber being formed in the upper part of said air cleaner case sectioned by said air cleaner element;
a second chamber being formed in the lower part of said air cleaner case sectioned by said air cleaner element, said second chamber being larger than said first chamber; and
shock absorbers connected between said body frame and said pair of right and left plates whereby said engine, said rear fork, said rear wheel axle, and said power transmitting means swing as a unit relative to said body frame of said motorcycle.

5. A motorcycle according to claim 4, wherein:
said second chamber is connected to communicate with a box-shaped body having a volume to form an expansion chamber for said box-shaped body and said second chamber.

6. A motorcycle according to claim 4, wherein:
said second chamber is connected with an upwardly extended vertically provided suction tube, and is made to communicate with the outside atmosphere through an upwardly opened suction port of said suction tube.

7. A motorcycle according to claim 4, wherein:
an opening is made in the front surface of said first chamber;
a connecting tube, made of a flexible elastic body and connected to the suction port of a carburetor of said engine, is fitted at its tip into said opening; and
said opening is sealed on the outside peripheral surface with a lip part provided in the intermediate portion of said connecting tube.

8. A motorcycle according to claim 4, wherein:
holding members are provided in the front and rear of the inside walls in the intermediate portion in the vertical direction of said air cleaner case; and
said air cleaner element is fitted to said holding members to transversely section said case.

9. A motorcycle according to claim 8, wherein:
an inserting port is made in the rear fork plate positioned on the side surface of said holding members so that said air cleaner element can be inserted and pulled out through said inserting port.

10. A motorcycle according to claim 9, wherein:
said air cleaner element is fitted with a filter element within said air cleaner element;
engaging projections to contact said holding members are provided on the right and left on the upper and lower surfaces of said air cleaner case; and
a lid part to close said inserting port is provided at one end of said case;
a knob for inserting and pulling out said case is provided outside said lid part; and
projections for preventing said case from escaping out of said inserting port are provided in positions adjacent to said inserting port as fitted.

11. A swinging power unit type motorcycle comprising:
a body frame;

an engine swingably hung on said body frame;
a pair of right and left plates forming a rear fork connected in the front end portions thereof to said engine;
a rear wheel axle supported between the rear end portions of said pair of right and left plates;
power transmitting means for transmitting power from said engine to said rear wheel axle;
an air cleaner case having a vertically extending elongated body mounted between said plates;
shock absorbers connected between said body frame and said pair of right and left plates whereby said engine, said rear fork, said rear wheel axle, and said power transmitting means swing as a unit relative to said body frame of said motorcycle;
said body of said air cleaner case being sectioned by an air cleaner element into a first chamber communicating with a carburetor of said engine and a second chamber communicating with a suction tube; and
said second chamber being larger than said first chamber.

12. A swinging power unit type motorcycle comprising:
a body frame;
a reduction gearbox;
means for pedaling said motorcycle;
an engine swingably hung on said body frame;
a pair of right and left plates forming a rear fork connected in the front end portions thereof to said engine;
a rear wheel axle supported between the rear end portions of one of said pair of right and left plates;
said reduction gearbox being mounted to the rear end of the other of said pair of plates and operatively connected to said rear wheel axle;
power transmitting means for transmitting power from said engine and from said pedaling means to said rear wheel axle;
a hollow box-shaped air cleaner case arranged between said right and left rear fork plates and made integral with said fork plates;
shock absorbers connected between said body frame and said pair of right and left plates whereby said engine, said means for pedaling said motorcycle, said rear fork, said rear wheel axle, and said power transmitting means swing as a unit relative to said body frame of said motorcycle;
said air cleaner case being formed to be vertical and being sectioned intermediately by an air cleaner element;
a chamber formed in the upper part of said air cleaner case sectioned by said air cleaner element; and
a chamber formed in the lower part of said air cleaner case sectioned by said air cleaner element, said lower chamber of said air cleaner case being larger than said chamber formed in said upper part of said air cleaner case.

13. A motorcycle according to claim 12, wherein:
said upper chamber communicates with a suction port of a carburetor of said engine; and
said lower chamber communicates with the outside atmosphere.

14. A motorcycle according to claim 12, wherein:
said lower chamber is connected to communicate with a box-shaped body having a volume to form an expansion chamber for said box-shaped body and said lower chamber.

15. A motorcycle according to claim 12, wherein:
said lower chamber is connected with an upwardly extended vertically provided suction tube, and is made to communicate with the outside atmosphere through an upwardly opened suction port of said suction tube.

16. A motorcycle according to claim 12, wherein:
an opening is made in the front surface of said upper chamber;
a connecting tube, mad of a flexible elastic body and connected to the suction port of a carburetor of said engine, is fitted at its tip into said opening; and
said opening is sealed on the outside peripheral surface with a lip part provided in the intermediate portion of said connecting tube.

17. A motorcycle according to claim 12, wherein said power transmitting means comprises:
a belt and a plurality of pulleys interposed between said engine and said reduction gearbox;
a one-way clutch affixed to said rear wheel axle; and
a chain and a plurality of sprockets interposed between said pedaling means and said one-way clutch.

* * * * *